United States Patent
Madarasz

(10) Patent No.: US 12,501,983 B2
(45) Date of Patent: Dec. 23, 2025

(54) BLADE TREATMENT ASSEMBLY

(71) Applicant: BAM Concepts, LLC, Jamestown, NC (US)

(72) Inventor: Attila John Madarasz, Tega Cay, SC (US)

(73) Assignee: BAM Concepts, LLC, Jamestown, NC (US)

( * ) Notice: Subject to any disclaimer, the term of this patent is extended or adjusted under 35 U.S.C. 154(b) by 328 days.

(21) Appl. No.: 18/447,827

(22) Filed: Aug. 10, 2023

(65) Prior Publication Data

US 2024/0049862 A1 Feb. 15, 2024

Related U.S. Application Data

(60) Provisional application No. 63/371,156, filed on Aug. 11, 2022.

(51) Int. Cl.
*A45D 27/46* (2006.01)
*B08B 3/02* (2006.01)

(52) U.S. Cl.
CPC ............... *A45D 27/46* (2013.01); *B08B 3/02* (2013.01)

(58) Field of Classification Search
None
See application file for complete search history.

(56) References Cited

U.S. PATENT DOCUMENTS

| | | |
|---|---|---|
| 7,134,935 B1 | 11/2006 | Papetti |
| 2017/0197234 A1 | 7/2017 | Rabie |
| 2021/0137302 A1 | 5/2021 | Rivera |
| 2021/0299710 A1 * | 9/2021 | Hayden .................... B08B 3/08 |
| 2022/0095885 A1 | 3/2022 | Boyer |

OTHER PUBLICATIONS

WIPO; International Preliminary Report on Patentability for corresponding International Patent Application No. PCT/US2023/072007, dated Feb. 4, 2025, 8 pages.

ISA/US; International Search Report and Written Opinion for corresponding International Patent Application No. PCT/US2023/072007, mailed Dec. 18, 2023, 9 pages.

* cited by examiner

*Primary Examiner* — Rita P Adhlakha
(74) *Attorney, Agent, or Firm* — NK Patent Law

(57) ABSTRACT

A blade treatment assembly designed to dispense a chemical solution to protect blades from tap water mineral buildup, oxidation, and bacterial growth. The blade treatment assembly includes a housing designed to receive a blade and a solution pod including the chemical solution. The blade treatment assembly is further configured to remove chemical solution from the solution pod and spray the chemical solution onto the blades.

20 Claims, 12 Drawing Sheets

BLADE TREATMENT ASSEMBLY

CROSS-REFERENCE TO RELATED APPLICATION

The present application claims the benefit of U.S. Provisional Patent Application No. 63/371,156, filed Aug. 11, 2022, the entire content of which is incorporated by reference herein in its entirety.

BACKGROUND

Field of the Invention

The present invention is generally directed to the field of razor blade treatment, more specifically to treating razor blades to prevent oxidation and bacteria growth and to eliminate mineral deposits from tap water.

Description of Related Art

Metal razor blades are susceptible to mineral build-up from minerals found in tap water. These build-ups of hard mineral deposits harbor moisture which can lead to rusting, pitting, uneven razor blades, and bacteria growth. In addition to the mineral build-up, many razors are susceptible to rusting when left in moisture-rich environments (e.g., bathroom), which causes most razors to only last between five to twenty shaves. An uneven blade causes cuts and pain for a user. Additionally, the moisture-rich environment supports bacteria growth on razor blades. Bacteria growth on a razor blade could lead to infection of any cuts on a user's face, head, armpits, legs, arms, and other parts of a user's body. Current solutions include a razor stand that keeps the razor upright and allows moisture to drip off, however, this does not prevent tap water minerals from drying and building up, oxidation of the razor blade, or bacteria growth. Therefore, there is a need for a razor blade treatment system that increases the longevity of a razor blade by protecting against tap water mineral buildup, oxidation, and bacteria growth.

BRIEF SUMMARY

According to one embodiment, the present invention includes a blade treatment assembly including a housing comprising a battery, a razor guide, at least one spray nozzle, a display, a switch, a pod receiving component, and a spring; and a pod including a chemical solution. The razor guide is designed to receive a blade. The spring is designed to move from an uncompressed position to a compressed position. When the spring is in the compressed position, the switch is designed to activate the at least one spray nozzle. The display is operable to indicate when the at least one spray nozzle is spraying the blade and to indicate when the at least one spray nozzle is finished spraying the blade.

In some embodiments, the blade treatment assembly further includes a display designed to display a number corresponding to the number of weeks a blade has been used. In some other embodiments, the display further includes at least one indicator operable to indicate a solution level, the at least one indicator is designed to generate a yellow light when the solution level is low and a red light when the solution level is empty or near empty. In an embodiment, the pod includes a transparent material. In another embodiment, the pod receiving component is designed to puncture the pod. In yet another embodiment, the at least one spray nozzle includes a plurality of spray nozzles. In one embodiment, the plurality of spray nozzles includes a first spray nozzle and a second spray nozzle. Each spray nozzle is separately attached to the pod receiving component.

According to another embodiment, the present invention includes a blade treatment assembly with a solution pod. The blade treatment assembly includes a housing comprising a battery, a razor guide, a motor, at least one spray nozzle, a display, a switch, a pod receiving component, and a spring; and a pod including a chemical solution. The razor guide is designed to receive a blade. The razor guide includes an end wall designed to position the blade to face the at least one spray nozzle. The spring is designed to move from an uncompressed position to a compressed position as the blade is positioned on the razor guide. Once the spring is compressed, the switch is designed to activate the at least one spray nozzle. The at least one spray nozzle is designed to spray the blade with the chemical solution. The display is operable to indicate when the at least one spray nozzle is spraying the blade, and when the at least one spray nozzle is finished spraying.

In some embodiments, the display is further designed to display a number corresponding to a number of weeks a blade has been used. In one embodiment, the display further includes at least one indicator operable to indicate a solution level. The at least one indicator is designed to generate a yellow light when the solution is low and a red light when the solution is empty or near empty. In another embodiment, the display is further operable to indicate a battery level. In yet another embodiment, the pod includes a transparent material. In one embodiment, the pod receiving component includes a plurality of spray nozzles. In one embodiment, the at least one spray nozzle includes a plurality of spray nozzles. In another embodiment, the plurality of spray nozzles includes a first nozzle and a second nozzle. Each nozzle of the plurality of spray nozzles is separately connected to the pod receiving component.

In yet another embodiment, the present invention includes a blade treatment assembly with a solution pod and a display. The blade treatment assembly includes a housing including a battery, a razor guide, a motor, a plurality of spray nozzles, a display, a switch, a pod receiving component, and a spring; and a pod including a chemical solution. The razor guide is designed to receive a blade. The spring is designed to move from an uncompressed position to a compressed position as the blade is positioned on the razor guide. Once the spring is compressed, the switch is designed to activate the plurality of spray nozzles. The plurality of spray nozzles is designed to spray the blade with the chemical solution. Each spray nozzle of the plurality of spray nozzles is separately connected to the pod. The display is operable to indicate when the plurality of spray nozzles is spraying the blade. The display is further operable to indicate when the plurality of spray nozzles is finished spraying.

In some embodiments, the razor guide includes an end wall designed to position the blade to face the plurality of spray nozzles. In one embodiment, the display further includes at least one indicator designed to indicate a solution level. The at least one indicator generates a yellow light when the solution is low and a red light when the solution is empty or near empty. In another embodiment, the display is further operable to indicate a battery level. In yet another embodiment, the pod includes a transparent material.

BRIEF DESCRIPTION OF THE SEVERAL VIEWS OF THE DRAWINGS

The embodiments illustrated, described, and discussed herein are illustrative of the present invention. As these embodiments of the present invention are described with reference to illustrations, various modifications, or adaptations of the methods and or specific structures described may become apparent to those skilled in the art. It will be appreciated that modifications and variations are covered by the above teachings and within the scope of the appended claims without departing from the spirit and intended scope thereof. All such modifications, adaptations, or variations that rely upon the teachings of the present invention, and through which these teachings have advanced the art, are considered to be within the spirit and scope of the present invention. Hence, these descriptions and drawings should not be considered in a limiting sense, as it is understood that the present invention is in no way limited to only the embodiments illustrated.

DETAILED DESCRIPTION

Figure 1:
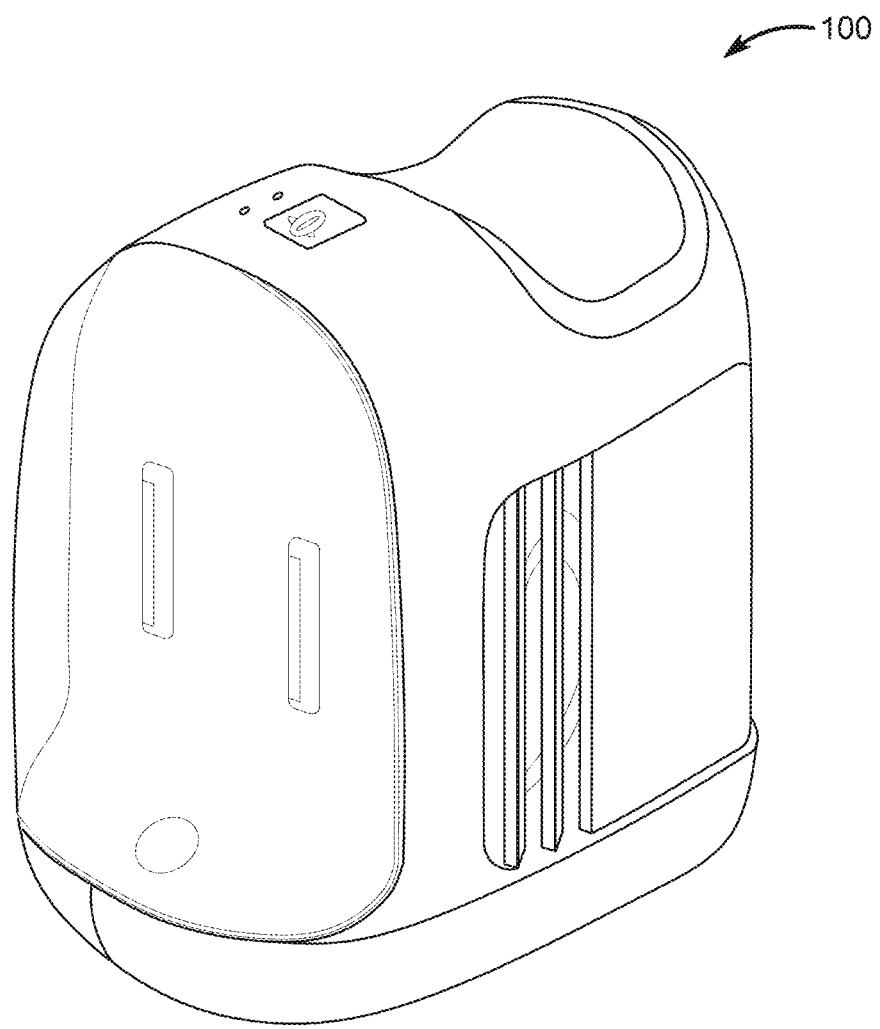
FIG. 1 illustrates a front perspective view of a blade treatment assembly according to one embodiment of the present invention.

For the purposes of promoting an understanding of the present disclosure, reference will be made to preferred embodiments and specific language will be used to describe the same. It will nevertheless be understood that no limitation of the scope of the disclosure is thereby intended, such alteration and further modifications of the disclosure as illustrated herein, being contemplated as would normally occur to one skilled in the art to which the disclosure relates.

Articles "a" and "an" are used herein to refer to one or to more than one (i.e., at least one) of the grammatical object of the article. By way of example, "a composite" means at least one composite and can include more than one composite.

Throughout the specification, the terms "about" may be used in conjunction with numerical values and/or ranges. The term "about" is understood to mean those values near to a recited value. For example, "about 40 [units]" may mean within +/−25% of 40 (e.g., from 30 to 50), within +/−20%, +/−15%, +/−10%, +/−9%, +/−8%, +/−7%, +/−6%, +/−5%, +/−4%, +/−3%, +/−2%, +/−1%, less than +/−1%, or any other value or range of values therein or there below.

As used herein, the verb "comprise" as is used in this description and in the claims and its conjugations are used in its non-limiting sense to mean that items following the word are included, but items not specifically mentioned are not excluded.

Throughout the specification the word "comprising," or variations such as "comprises" or "comprising," will be understood to imply the inclusion of a stated element, integer or step, or group of elements, integers, or steps, but not the exclusion of any other element, integer or step, or group of elements, integers, or steps. The present disclosure may suitably "comprise", "consist of", or "consist essentially of", the steps, elements, and/or reagents described in the claims.

It is further noted that the claims may be drafted to exclude any optional element. As such, this statement is intended to serve as antecedent basis for use of such exclusive terminology as "solely", "only", and the like in connection with the recitation of claim elements, or the use of a "negative" limitation.

Unless defined otherwise, all technical and scientific terms used herein have the same meanings as commonly understood by one of ordinary skill in the art to which this disclosure belongs. Preferred methods, devices, and materials are described, although any methods and materials similar or equivalent to those described herein can be used in the practice or testing of the present disclosure. All references cited herein are incorporated by reference in their entirety.

The subject matter described herein includes a blade treatment assembly. According to one embodiment, the present invention includes a blade treatment assembly including a housing comprising a battery, a razor guide, at least one spray nozzle, a display, a switch, a pod receiving component, and a spring; and a pod including a chemical solution. The razor guide is designed to receive a blade. The spring is designed to move from an uncompressed position to a compressed position. When the spring is in the compressed position, the switch is designed to activate the at least one spray nozzle. The display is operable to indicate when the at least one spray nozzle is spraying the blade and to indicate when the at least one spray nozzle is finished spraying the blade.

In some embodiments, the blade treatment assembly further includes a display designed to display a number corresponding to the number of weeks a blade has been used. In some other embodiments, the display further includes at least one indicator operable to indicate a solution level, the at least one indicator is designed to generate a yellow light when the solution level is low and a red light when the solution level is empty or near empty. In an embodiment, the pod includes a transparent material. In another embodiment, the pod receiving component is designed to puncture the pod. In yet another embodiment, the at least one spray nozzle includes a plurality of spray nozzles. In one embodiment, the plurality of spray nozzles includes a first spray nozzle and a second spray nozzle. Each spray nozzle is separately attached to the pod receiving component.

According to another embodiment, the present invention includes a blade treatment assembly with a solution pod. The blade treatment assembly includes a housing comprising a battery, a razor guide, a motor, at least one spray nozzle, a display, a switch, a pod receiving component, and a spring; and a pod including a chemical solution. The razor guide is designed to receive a blade. The razor guide includes an end wall designed to position the blade to face the at least one spray nozzle. The spring is designed to move from an uncompressed position to a compressed position as the blade is positioned on the razor guide. Once the spring is compressed, the switch is designed to activate the at least one spray nozzle. The at least one spray nozzle is designed to spray the blade with the chemical solution. The display is operable to indicate when the at least one spray nozzle is spraying the blade, and when the at least one spray nozzle is finished spraying.

In some embodiments, the display is further designed to display a number corresponding to a number of weeks a blade has been used. In one embodiment, the display further includes at least one indicator operable to indicate a solution level. The at least one indicator is designed to generate a yellow light when the solution is low and a red light when the solution is empty or near empty. In another embodiment, the display is further operable to indicate a battery level. In yet another embodiment, the pod includes a transparent material. In one embodiment, the pod receiving component includes a plurality of spray nozzles. In one embodiment, the at least one spray nozzle includes a plurality of spray nozzles. In another embodiment, the plurality of spray nozzles includes a first nozzle and a second nozzle. Each nozzle of the plurality of spray nozzles is separately connected to the pod receiving component.

In yet another embodiment, the present invention includes a blade treatment assembly with a solution pod and a display. The blade treatment assembly includes a housing including a battery, a razor guide, a motor, a plurality of spray nozzles, a display, a switch, a pod receiving component, and a spring; and a pod including a chemical solution. The razor guide is designed to receive a blade. The spring is designed to move from an uncompressed position to a compressed position as the blade is positioned on the razor guide. Once the spring is compressed, the switch is designed to activate the plurality of spray nozzles. The plurality of spray nozzles is designed to spray the blade with the chemical solution. Each spray nozzle of the plurality of spray nozzles is separately connected to the pod. The display is operable to indicate when the plurality of spray nozzles is spraying the blade. The display is further operable to indicate when the plurality of spray nozzles is finished spraying.

In some embodiments, the razor guide includes an end wall designed to position the blade to face the plurality of spray nozzles. In one embodiment, the display further includes at least one indicator designed to indicate a solution level. The at least one indicator generates a yellow light when the solution is low and a red light when the solution is empty or near empty. In another embodiment, the display is further operable to indicate a battery level. In yet another embodiment, the pod includes a transparent material.

The blade treatment assembly is designed to create a hygienic location for a razor and other similar sharp instruments. The blade treatment assembly is configured to automatically treat a deposited razor with a chemical solution to prevent tap water mineral buildup, oxidation, and/or bacterial contamination of a razor blade.

Figure 2:
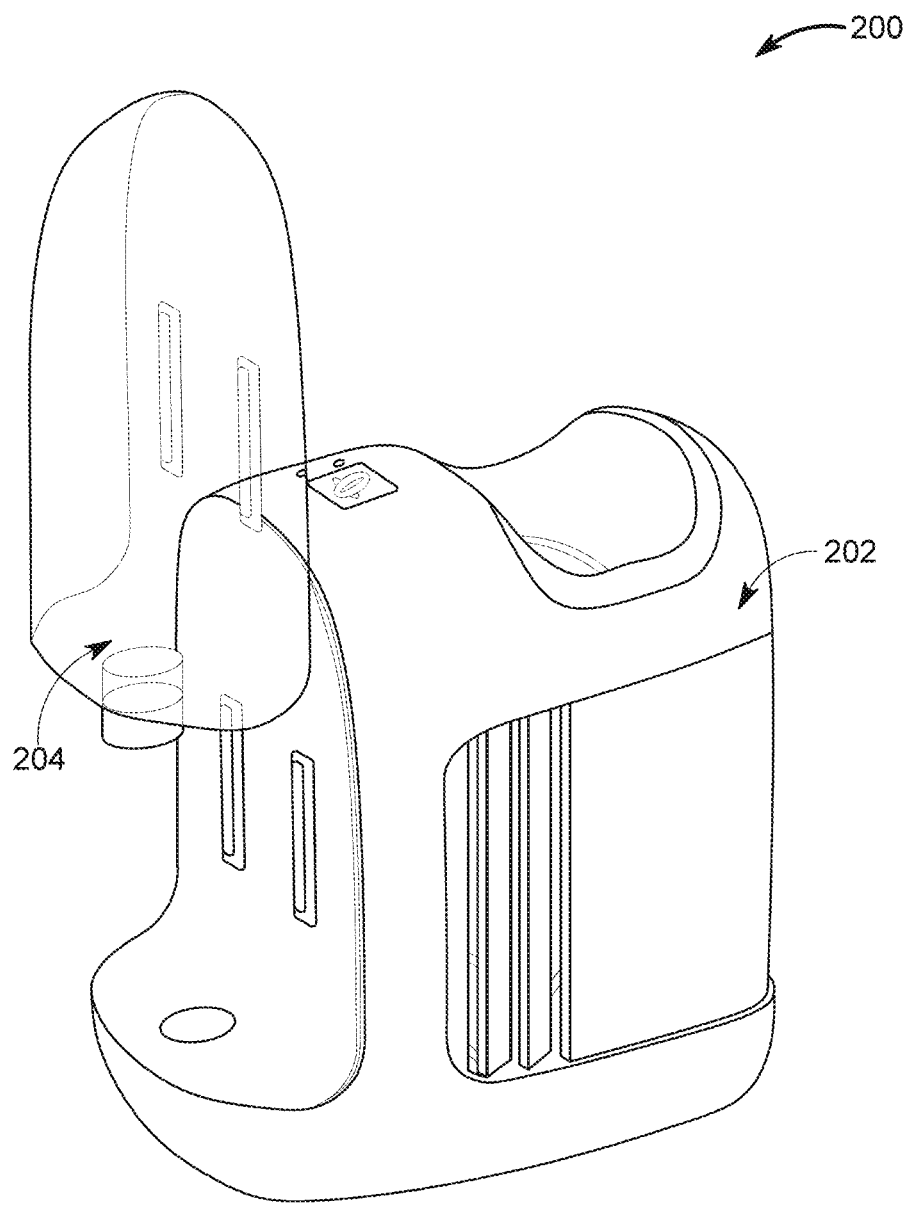
FIG. 2 illustrates a side perspective view of a blade treatment assembly according to one embodiment of the present invention.

FIG. 1 illustrates a blade treatment assembly according to one embodiment of the present invention. As shown in FIG. 2, the blade treatment assembly 200 includes a housing 202 and a solution pod 204. The housing 202 is designed to receive the solution pod 204. In one embodiment, the solution pod is removably attached to the housing. Alternatively, in another embodiment, the solution pod is permanently attached to the housing.

The solution pod is designed to conform to the housing of the blade treatment assembly. For example, and not limitation, the pod includes a plurality of tabs and/or a plurality of notches designed to attach to corresponding holes in the blade treatment assembly. Advantageously, the pod further includes a transparent material. This enables a user to see the amount of solution remaining in the pod. Alternatively, the pod includes an opaque material. In yet another embodiment, the pod comprises a recyclable material. The solution pod further includes a seal designed to be punctured by the piercing component of the assembly. After the seal is punctured, the solution is passed from the solution pod to the housing to be sprayed onto the razor. The blade treatment assembly further includes a valve (e.g., a check valve) designed to prevent fluid from flowing back to the solution pod.

In one embodiment, the solution pod includes a composition designed to prevent tap water mineral buildup, oxidation, and/or contamination of a razor blade (e.g., an anticorrosive agent or an antimicrobial agent) and prevents bacteria from growing. For example, and not limitation, the chemical composition includes the blade treatment composition as disclosed in US Patent Publication No. 2020/0224131, U.S. Pat. No. 11,193,095, and US Patent Publication No. 2022/0049195, each of which is herein incorporated by reference in its entirety. Alternatively, the solution pod includes other compositions to treat blades including anticorrosion compositions and cleaning compositions. In one embodiment, the pod includes at least one ounce of the composition to prevent tap water mineral build-up, oxidation, and/or contamination of the razor blade. In yet another embodiment, the solution pod includes at least four ounces of the composition designed to prevent tap water mineral build-up, oxidation, and/or contamination of a razor blade. Additionally, or alternatively, the blade treatment assembly includes a lighting component designed to prevent bacteria from growing and/or reduce bacteria. For example, and not limitation, the blade treatment assembly includes an ultraviolet (UV) lighting component. The UV lighting component is positioned in proximity to the spray nozzles, so the ultraviolet light generated by the UV lighting component hits the spray nozzle. Advantageously, this helps prevent the growth of bacteria around the spray nozzle without the nozzles being removed.

Figure 3:
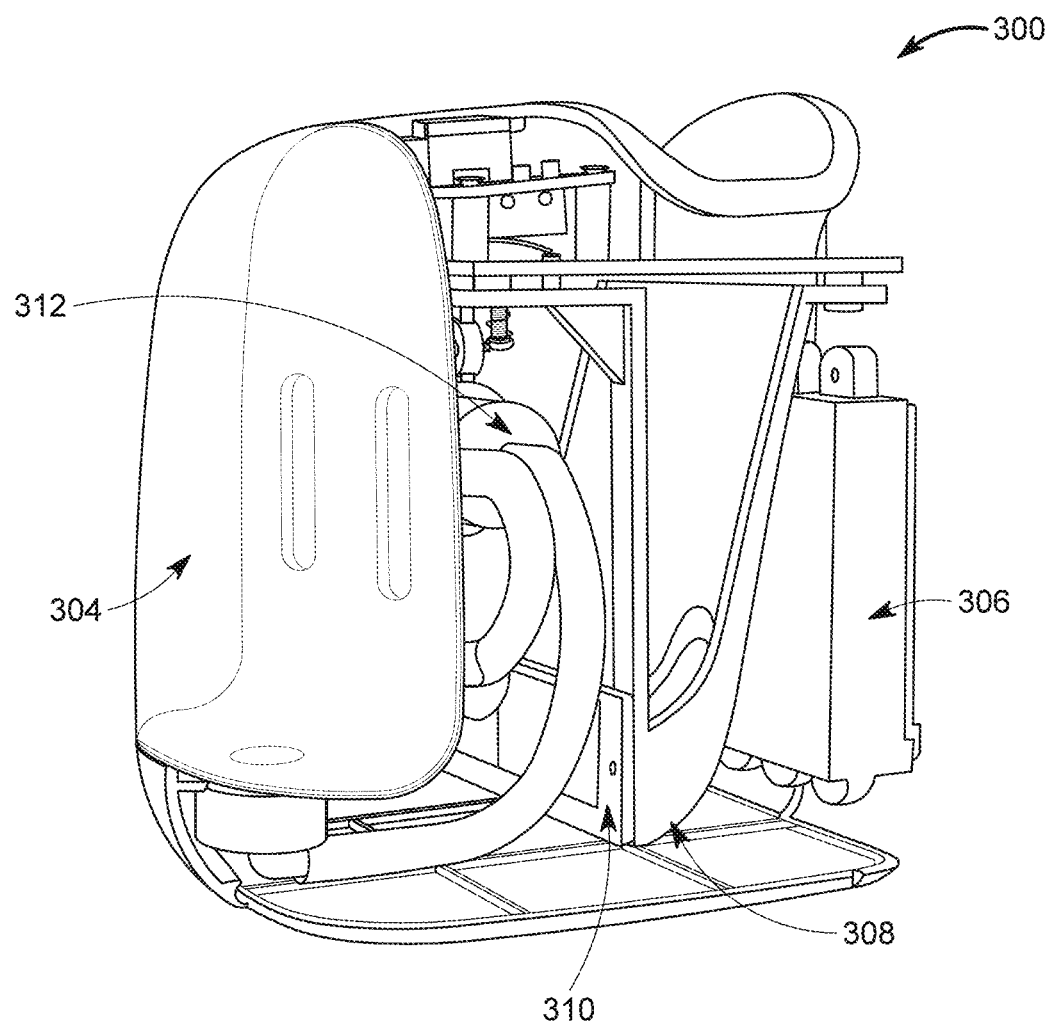
FIG. 3 illustrates a side perspective view of the interior of a blade treatment assembly according to one embodiment of the present invention.

In another embodiment, as shown in FIG. 3, the housing 300 includes a battery 306, a razor guide 308, a stop wall 310, a pump motor 312, and at least one spray nozzle (not shown). In one embodiment, the battery is rechargeable. In another embodiment, the battery is non-rechargeable and replaceable. The razor guide 308 is designed to receive a razor. Advantageously, the razor guide 308 positions the razor so the blade portion of the razor is facing at least one spray nozzle. For example, and not limitation, in some embodiments, the stop wall 310 includes a plurality of wall members (e.g., vertical support components) to improve the positioning of the razor. Alternatively, in some embodiments, the stop wall 310 does not include any support members that come into contact with the face of the razor blade. Advantageously, this improves the spray coverage of the razor because the stop wall does not cover any portion of the razor blade. In some embodiments, the razor guide includes a positioning component (e.g., notch, guide) designed to keep a razor handle in a center position relative to the razor guide. In yet another embodiment, the at least one spray nozzle includes at least two spray nozzles.

Figure 4:
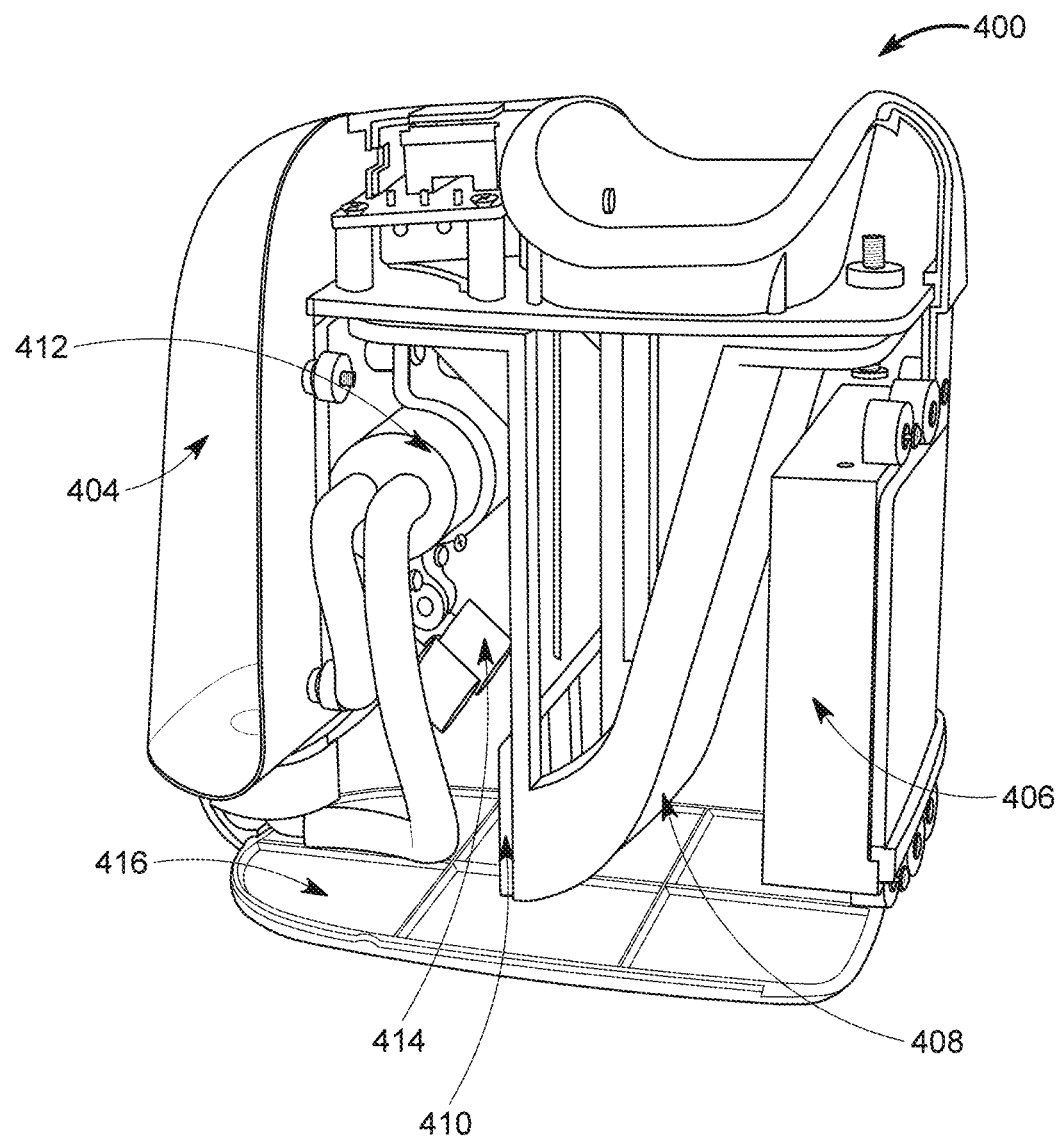
FIG. 4 illustrates a side perspective view of the interior of a blade treatment assembly according to one embodiment of the present invention.

FIG. 4 shows a side perspective view of a blade treatment assembly including a housing 400. The housing includes a pod 404, a battery 406, a razor guide 408, a stop wall 410, a pump motor 412, and at least one spray nozzle 414. Additionally, FIG. 4 includes a bottom plate 416. The bottom plate, in some embodiments, is removably attached to the housing. For further example and not limitation, in some embodiments, the depth of the bottom plate is increased, and the bottom plate further includes a lip on the top of the bottom plate. Alternatively, or additionally, the bottom plate includes a lip surrounding the edge of the bottom plate that captures excess solution spillage. Advantageously, the bottom plate is designed to catch any solution spillage. In some embodiments, the razor guide 408 includes a positioning component (e.g., notch, guide) designed to keep a razor handle in a center position relative to the razor guide.

Figure 5:
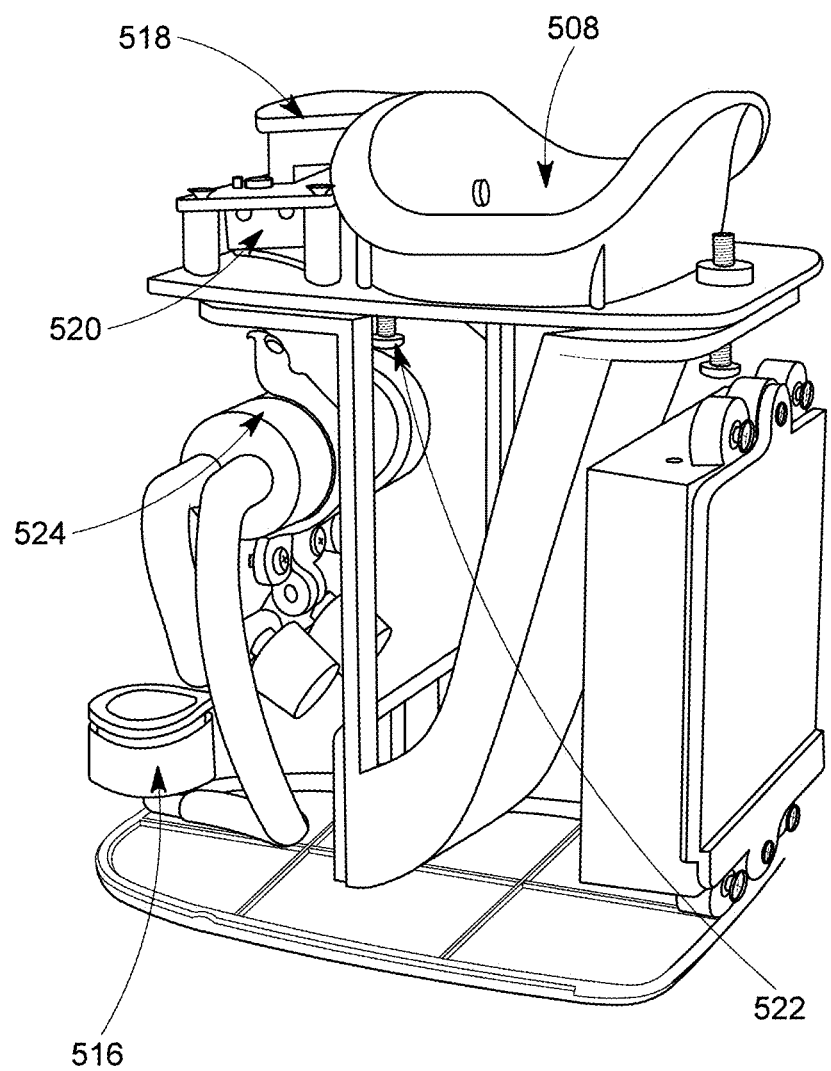
FIG. 5 illustrates a rear-side perspective view of a blade treatment assembly according to one embodiment of the present invention.

As shown in FIG. 5, the assembly further includes a solution pod coupling with a piercing component 516, a display 518, a switch 520, a spring 522, and a solution chamber 524. The assembly is designed to receive a razor via the razor guide 508 until the spring 522 is compressed. In some embodiments, the razor guide 508 includes a positioning component (e.g., notch, guide) designed to keep a razor handle in a center position relative to the razor guide. Once the spring 522 is compressed, the switch 520 is designed to activate the pump. For example, and not limitation, the pump may include a different shape, dimension, and/or controllable power output to optimize the interior space and the power requirements of the blade treatment assembly. The solution chamber 524 is designed to receive the chemical solution via tubing connected to the piercing component 516. The plurality of spray nozzles 514 is connected to the solution chamber 524 via tubing. In yet another embodiment, each spray nozzle of the plurality of spray nozzles is separately connected to the solution chamber. The assembly activation results in the chemical composition from the solution pod being sprayed onto the razor blade and the display is updated with the number of weeks a razor has been in use with the system in ascending order. Additionally, in one embodiment, the blade treatment assembly further includes a LED light positioned behind the solution pod that is designed to create a pulsating light after the pump is activated. The plurality of spray nozzles is designed to release solution with three sequential sprays. In one embodiment, the plurality of spray nozzles is designed for pulsatile spraying, flat spraying, and/or cone spraying. A further example, and not limitation, the nozzle includes an adjustable size and shape, and/or is removably mounted to the housing. Advantageously, this allows for the optimization of dispensing the solution because the spray nozzles are adjustable to a desired flow rate and spray shape.

Figure 6:
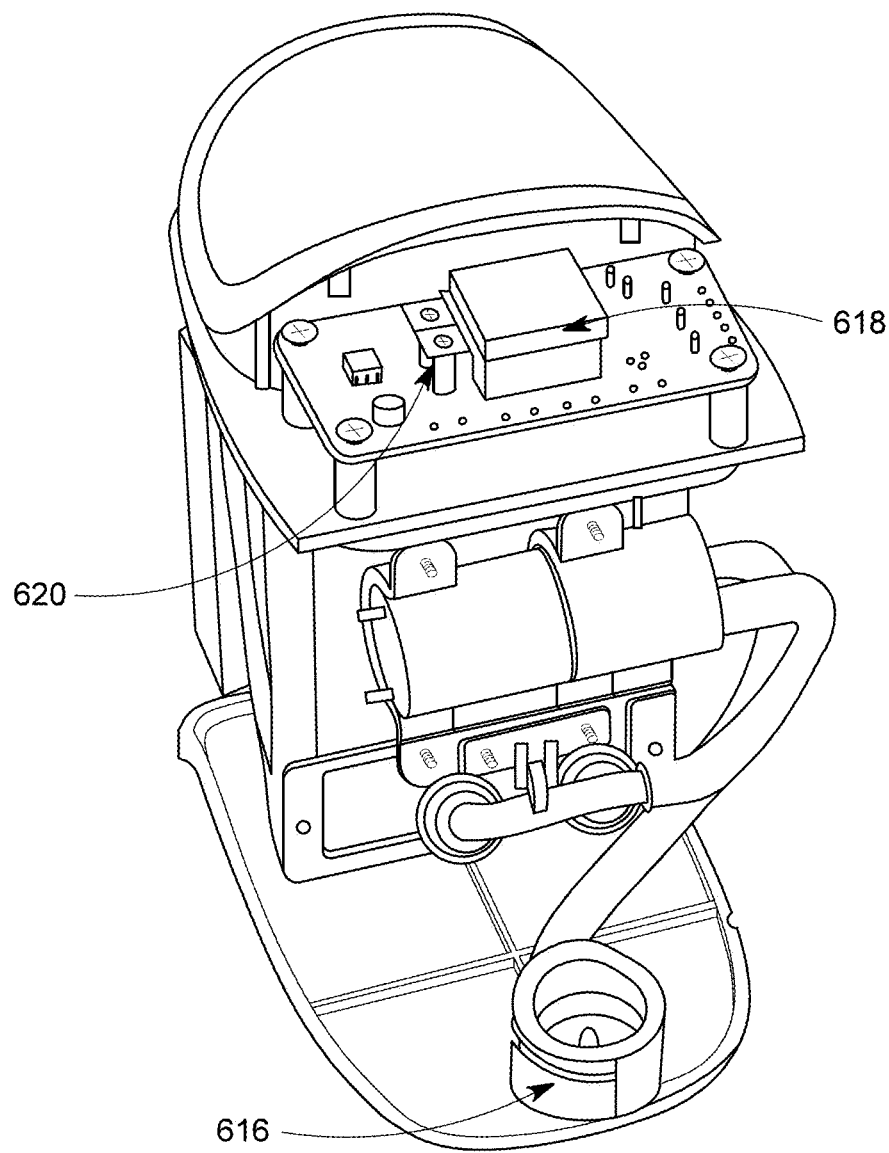
FIG. 6 illustrates a front perspective view of an interior of a blade treatment assembly according to one embodiment of the present invention.

As shown in FIG. 6, in one embodiment, the blade treatment assembly includes a pod receiving component 616 and a display 618 including a light-emitting diode (LED). The LED display is designed to activate when the razor is being treated. The display further includes a digital component designed to count the number of weeks passed to determine the lifetime of the razor. The blade treatment assembly further includes at least one indicator corresponding to battery level. For example, and not limitation, the indicator is designed to display a yellow light when the battery is low. The indicator is further designed to generate a red light when the battery is almost out of power. In yet another embodiment, the blade treatment assembly further includes at least one indicator designed to indicate the amount of remaining solution. For example, and not limitation, when the solution is low, the indicator will display a yellow color, and when the solution is almost empty the indicator will generate a red color. In one embodiment, the indicator color is based on an expected number of treatments. In another embodiment, the blade treatment assembly further includes a sensor designed to measure the amount of remaining solution. (e.g., a pressure sensor or a light sensor).

In another embodiment, the blade treatment assembly further includes at least two indicators (e.g., LED light) designed to indicate remaining battery life and/or remaining uses of the solution pod. The blade treatment assembly further includes at least two buttons positioned near the opening above the razor guide. In one embodiment, the at least two buttons correspond to the at least two indicators. For example, and not limitation, at least one button of the at least two buttons is designed to reset the indicator corresponding to the amount of weeks passed and the other button is designed to reset the indicator corresponding to the amount of uses remaining in the solution pod. Advantageously, at least one button of the at least two buttons is designed to control a spray duration and a volume of solution released from the solution pod. In one embodiment, the spray duration is measured in milliseconds.

Figure 7A:
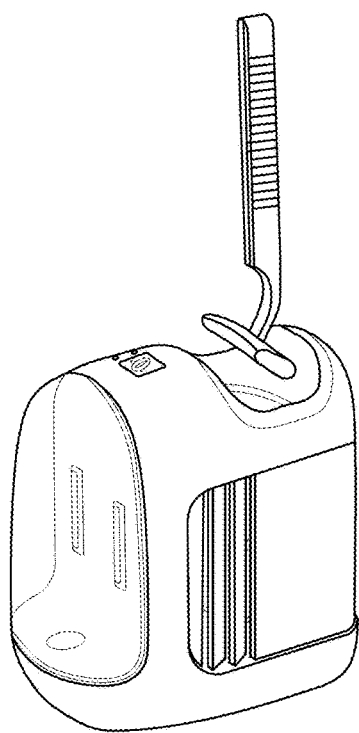
FIG. 7A illustrates a side perspective view of a blade treatment assembly receiving a razor according to one embodiment of the present invention.
Figure 7B:
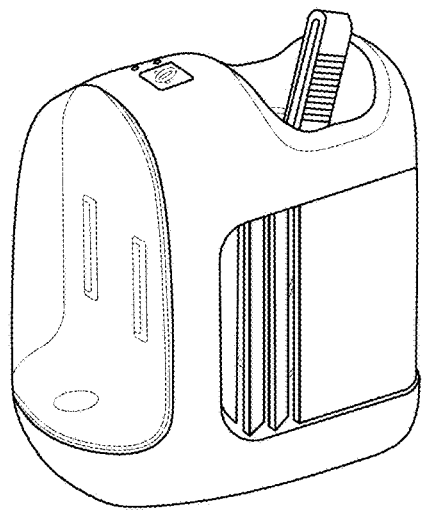
FIG. 7B illustrates a decompressed razor in a blade treatment assembly according to one embodiment of the present invention.
Figure 8:
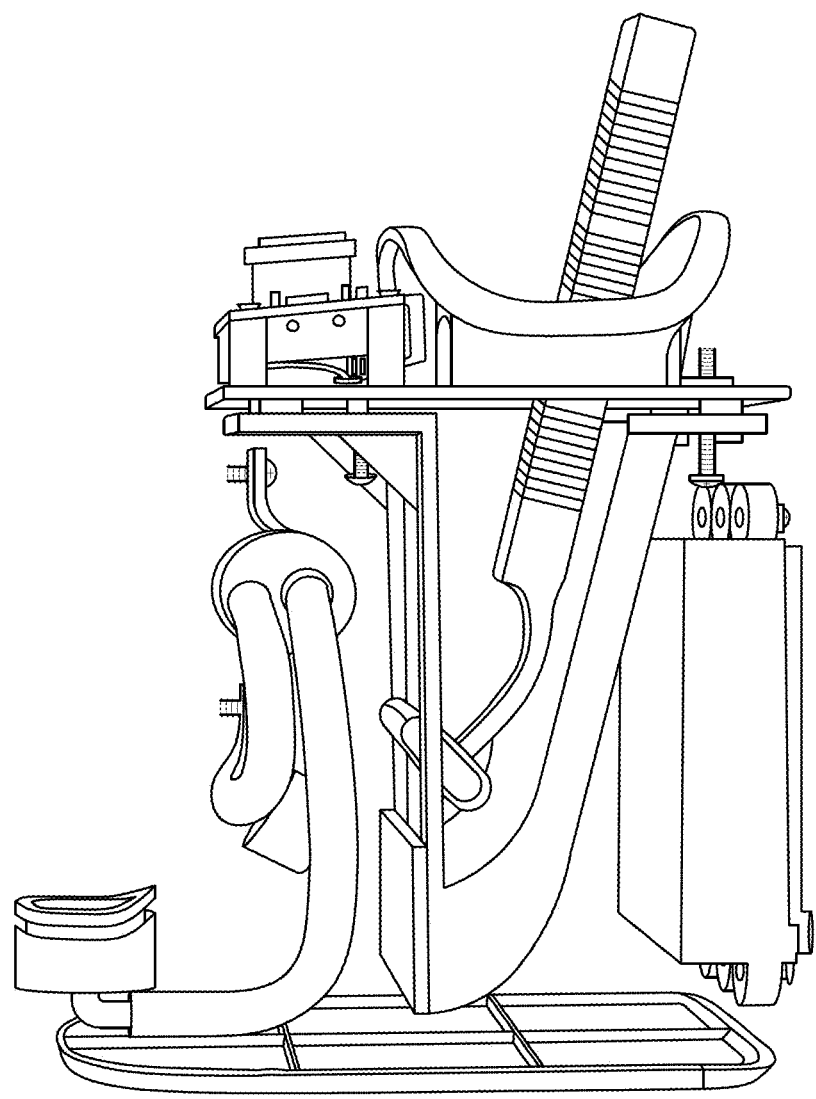
FIG. 8 illustrates a side perspective view of an interior of a blade treatment assembly according to one embodiment of the present invention.

FIGS. 7A and 7B illustrate the insertion of a razor according to one embodiment of the present invention. As shown in FIG. 7A, the razor is inserted through an opening above the razor guide inside the housing. The razor guide is designed to receive the razor with the razor body resting against the razor guide. FIG. 8 illustrates a side interior view of a razor being inserted into the blade treatment assembly.

Figure 9A:
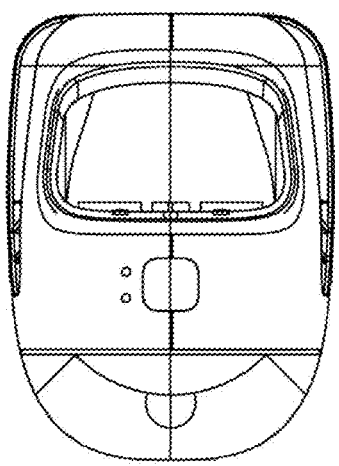
FIG. 9A illustrates a top view of a blade treatment assembly according to one embodiment of the present invention.
Figure 9B:
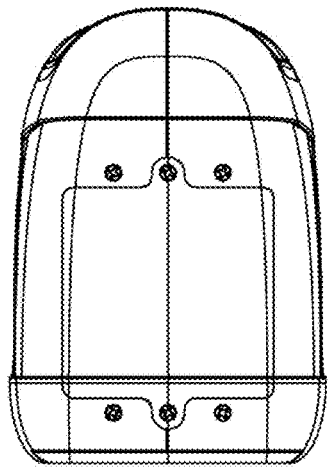
FIG. 9B illustrates a rear view of a blade treatment assembly according to one embodiment of the present invention as shown in FIG. 9A.
Figure 9C:
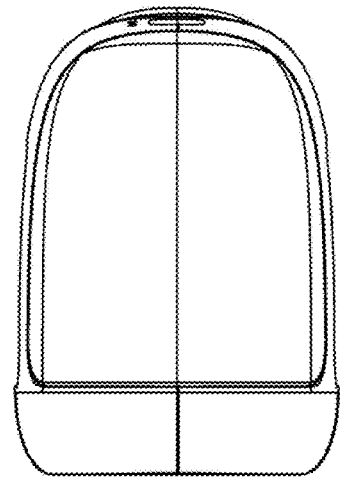
FIG. 9C illustrates a front view of a blade treatment assembly according to one embodiment of the present invention as shown in FIG. 9A.
Figure 9D:
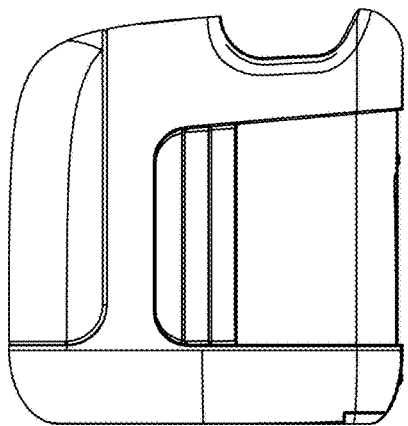
FIG. 9D illustrates a side view of a blade treatment assembly according to one embodiment of the present invention as shown in FIG. 9A.
Figure 9E:
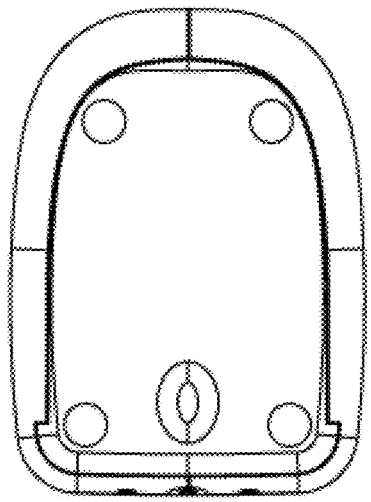
FIG. 9E illustrates a bottom view of a blade treatment assembly according to one embodiment of the present invention as shown in FIG. 9A.

FIGS. 9A-9E illustrate various views of the blade treatment assembly according to one embodiment of the present invention. FIG. 9A illustrates a top view of a blade treatment assembly according to one embodiment of the present invention. FIG. 9B illustrates a rear view of a blade treatment assembly according to one embodiment of the present invention as shown in FIG. 9A. FIG. 9C illustrates a front view of a blade treatment assembly according to one embodiment of the present invention as shown in FIG. 9A. FIG. 9D illustrates a side view of a blade treatment assembly according to one embodiment of the present invention as shown in FIG. 9A. FIG. 9E illustrates a bottom view of a blade treatment assembly according to one embodiment of the present invention as shown in FIG. 9A.

Figure 10:
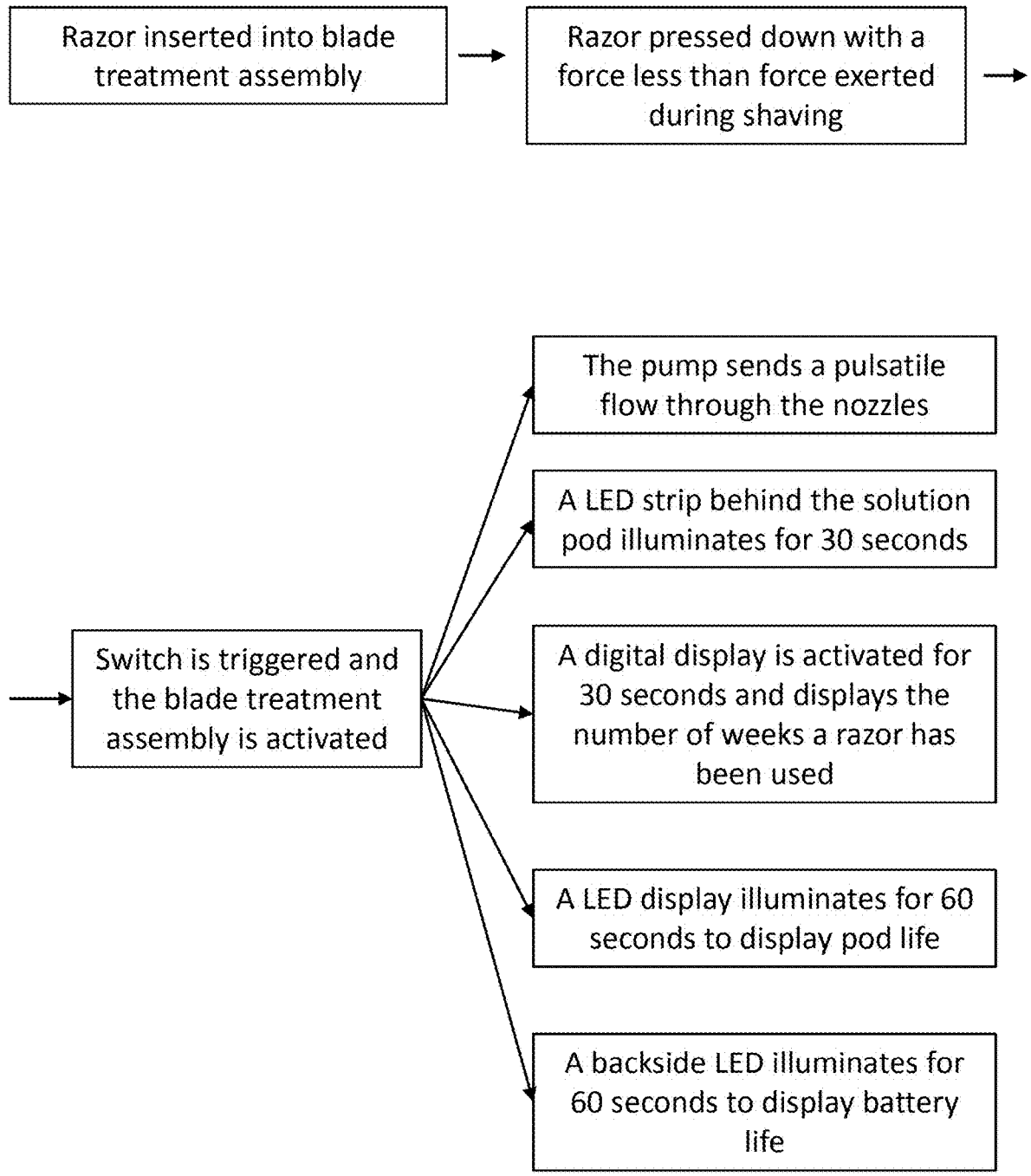
FIG. 10 illustrates a schematic diagram of a treatment process according to one embodiment of the present invention.

FIG. 10 illustrates a schematic diagram of a treatment process according to one embodiment of the present invention. First, a razor is inserted into a blade treatment assembly. Next, the razor is pressed down with force less than the force exerted when shaving a face. Once the razor is fully inserted, a switch is triggered, and the assembly is activated. After the assembly is activated, a pump sends a pulsatile flow through a plurality of nozzles. A light emitting diode (LED) strip positioned behind a solution pod is illuminated for about thirty seconds. A digital display is activated for about thirty seconds and displays the number of weeks a razor has been used. A LED display is activated for sixty seconds, and the color of the LED display corresponds to the amount of remaining pod solution. A second LED display is illuminated for sixty seconds, and the color of the second LED display corresponds to the remaining battery of the blade treatment assembly.

Figure 11:
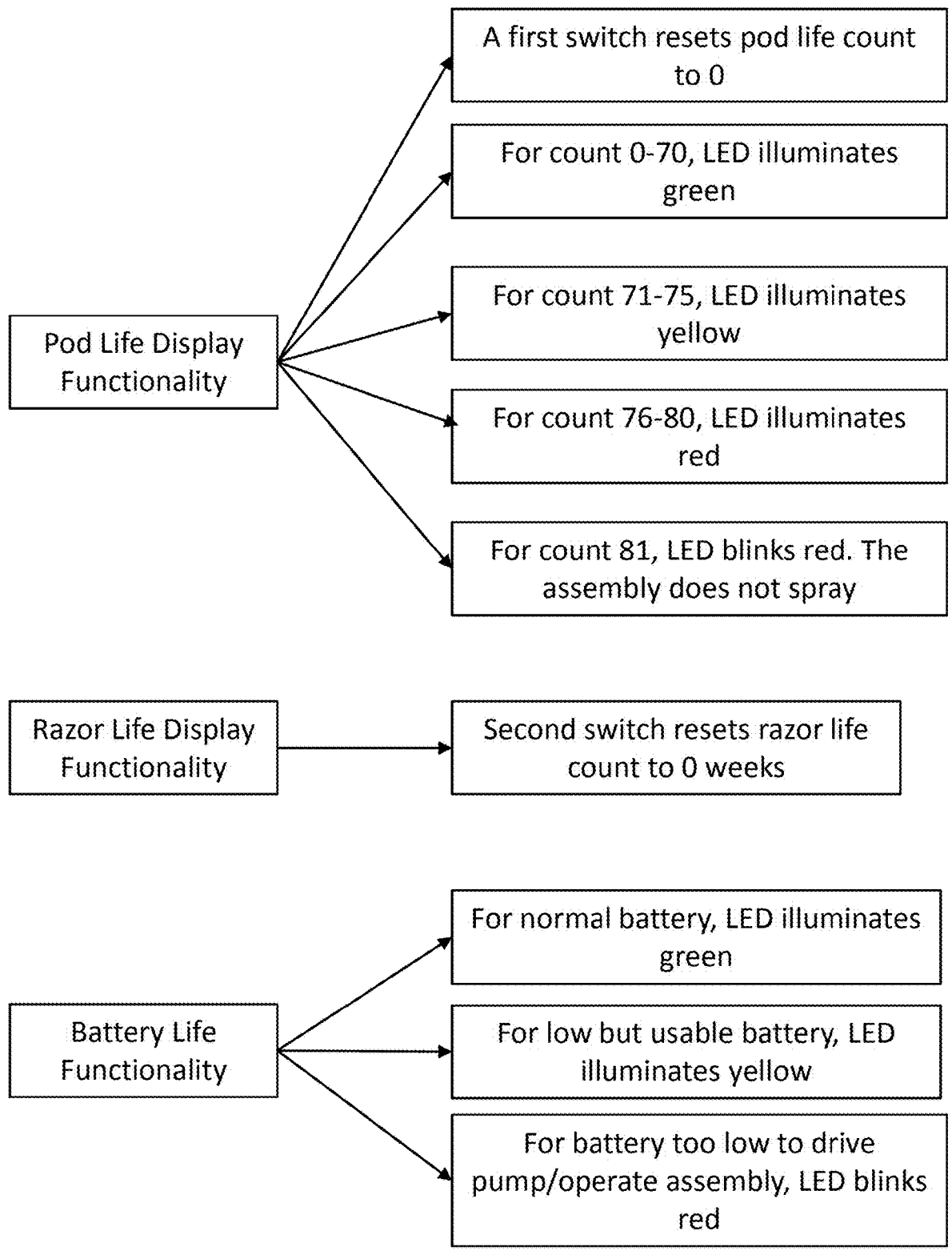
FIG. 11 illustrates a schematic diagram of a plurality of functions of a blade treatment assembly according to one embodiment of the present invention.

FIG. 11 illustrates a schematic diagram of a plurality of functions of a blade treatment assembly according to one embodiment of the present invention. For example, and not limitation, in one embodiment, the blade treatment assembly includes a display corresponding to the amount of remaining solution in the solution pod. The pod display is designed to (1) reset to 0 after a corresponding switch is triggered, (2) illuminate a green color when the number of treatments is between 0-70, (3) illuminate a yellow color when the number of treatments is between about 71 and about 75, (4) illuminate a red color when the number of treatments is between about 76 and about 80, and (5) blink red when the number of treatments is 81. When the pod display is blinking red then the blade treatment assembly is designed to not spray. In another embodiment, the blade treatment assembly includes a display corresponding to the number of uses of a razor. The razor display is designed to reset to zero after a corresponding switch is triggered. In yet another embodiment, the blade treatment assembly includes a display corresponding to the remaining power in a battery. For example, and not limitation, the battery power display is designed to (1) illuminate a green color when the battery is healthy (e.g., at least 50%), (2) illuminate a yellow color when the power is low but usable (e.g., between about 10% and about 50%), and (3) illuminate a blinking red light when the battery has insufficient power to power the blade treatment assembly (e.g., about 0%).

The blade treatment assembly is designed to be used and/or attached on a countertop, a bathtub side, a wall, and other similar environments. For example, and not limitation, the blade treatment assembly includes a mounting bracket or similar fastener to attach to a wall. For further example, and not limitation, the blade treatment assembly is designed to function between about nine months to about twelve months before a battery replacement is needed. When treating a blade, the blade treatment assembly is designed to run for at least thirty seconds. The blade treatment is further operable to rinse other shaving and/or cutting instruments including but not limited to straight razors, knives, blades, box cutters, and scissors scalpels.

Figure 12:
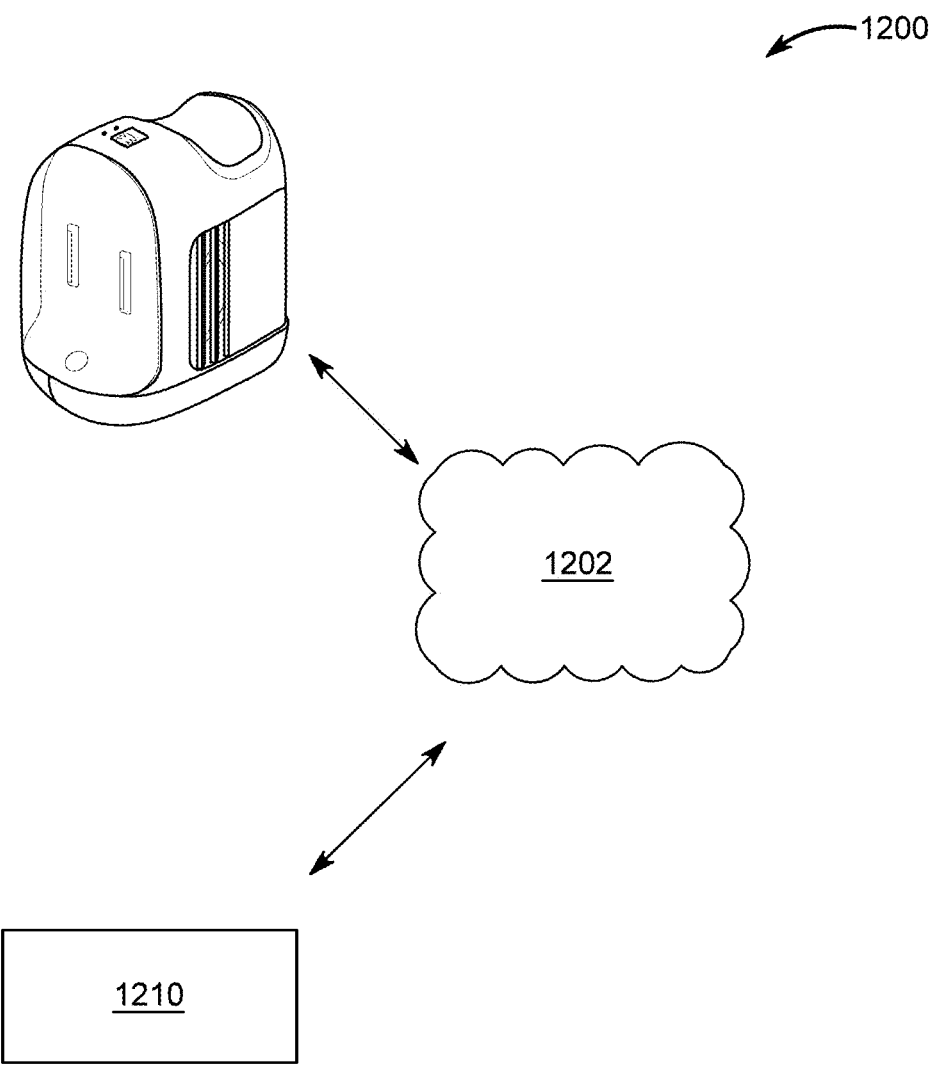
FIG. 12 illustrates a schematic diagram of a blade treatment system according to one embodiment of the present invention.

In another embodiment, the blade treatment assembly includes a waterproof material. The blade treatment assembly further includes a mounting component designed to attach to a vertical surface and/or a horizontal surface. For example, and not limitation, the mounting component is designed to attach to a shower wall. In yet another embodiment, the blade treatment assembly further includes a sound-generating device (e.g., a speaker). In another embodiment, as shown in FIG. 12, the blade treatment assembly is further designed for network communication. For example, and not limitation, the blade treatment assembly is configured for BLUETOOTH, WI-FI, and similar methods of network communication. Advantageously, the blade treatment assembly is in network communication with a third-party merchant device. For example, and not limitation, the blade treatment assembly is designed to order at least one solution pod based on the solution level of a solution pod attached to the blade treatment assembly.

In one embodiment, the blade treating assembly includes at least one antenna, which allows the blade treating assembly 1200 to send information (e.g., pod solution level) to at least one remote device 1210 (e.g., smartphone, tablet, laptop computer) via a network 1202. The at least one antenna provides wireless communication, standards-based or non-standards-based, by way of example and not limitation, WI-FI, WORLDWIDE INTEROPERABILITY FOR MICROWAVE ACCESS (WIMAX), Radio Frequency (RF) communication including RF identification (RFID), NEAR FIELD COMMUNICATION (NFC), BLUETOOTH including BLUETOOTH LOW ENERGY (BLE), ZIGBEE, Infrared (IR) communication, cellular communication, satellite communication, Universal Serial Bus (USB), Ethernet communications, communication via fiber-optic cables, coaxial cables, twisted pair cables, and/or any other type of wireless or wired communication. or similar commercially used standards. For example, and not limitation, in one embodiment, the at least one remote device includes a merchant device. The blade treatment assembly is designed to automatically transmit an order request to the merchant device when solution level of the least one solution pod is low.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:
1. A blade treatment assembly comprising:
   a housing comprising a battery, a razor guide, at least one spray nozzle, a display, a switch, a pod receiving component, and a spring; and
   a pod including a chemical solution;
      wherein the razor guide is designed to receive a blade;
      wherein the spring is designed to move from an uncompressed position to a compressed position as the blade is positioned on the razor guide;

wherein, once the spring is compressed, the switch is designed to activate the at least one spray nozzle wherein the at least one spray nozzle is designed to spray the blade with the chemical solution;

wherein the display is operable to indicate when the at least one spray nozzle is spraying the blade; and wherein the display is further operable to indicate when the at least one spray nozzle is finished spraying the blade.

2. The assembly of claim 1, wherein the display is further designed to display a number, wherein the number corresponds to a number of weeks a blade has been used.

3. The assembly of claim 1, wherein the display further includes at least one indicator, wherein the at least one indicator is operable to indicate a solution level, wherein the at least one indicator is designed to generate a yellow light when the solution level is low and a red light when the solution level is empty or near empty.

4. The assembly of claim 1, wherein the pod includes a transparent material.

5. The assembly of claim 1, wherein the pod receiving component is designed to puncture the pod.

6. The assembly of claim 1, wherein the at least one spray nozzle includes a plurality of spray nozzles.

7. The assembly of claim 6, wherein the plurality of spray nozzles includes a first nozzle and a second nozzle, wherein each nozzle of the plurality of spray nozzles is separately connected to the pod receiving component.

8. A blade treatment assembly comprising
a housing comprising a battery, a razor guide, a motor, at least one spray nozzle, a display, a switch, a pod receiving component, and a spring; and
a pod including a chemical solution;
wherein the razor guide is designed to receive a blade, wherein the razor guide includes an end wall, wherein the end wall is designed to position the blade to face the at least one spray nozzle;
wherein the spring is designed to move from an uncompressed position to a compressed position as the blade is positioned on the razor guide;
wherein, once the spring is compressed, the switch is designed to activate the at least one spray nozzle;
wherein the at least one spray nozzle is designed to spray the blade with the chemical solution;
wherein the display is operable to indicate when the at least one spray nozzle is spraying the blade; and
wherein the display is further operable to indicate when the at least one spray nozzle is finished spraying.

9. The assembly of claim 8, wherein the display is further designed to display a number, wherein the number corresponds to a number of weeks a blade has been used.

10. The assembly of claim 8, wherein the display further includes at least one indicator, wherein the at least one indicator is operable to indicate a solution level, wherein the at least one indicator is designed to generate a yellow light when the chemical solution is low and a red light when the chemical solution is empty or near empty.

11. The assembly of claim 8, wherein the display is further operable to indicate a battery level.

12. The assembly of claim 8, wherein the pod includes a transparent material.

13. The assembly of claim 8, wherein the pod receiving component is designed to puncture the pod.

14. The assembly of claim 8, wherein the at least one spray nozzle includes a plurality of spray nozzles.

15. The assembly of claim 14, wherein the plurality of spray nozzles includes a first nozzle and a second nozzle, wherein each nozzle of the plurality of spray nozzles is separately connected to the pod receiving component.

16. A blade treatment assembly comprising:
a housing comprising a battery, a razor guide, a motor, a plurality of spray nozzles, a display, a switch, a pod receiving component, and a spring; and
a pod including a chemical solution;
wherein the razor guide is designed to receive a blade;
wherein the spring is designed to move from an uncompressed position to a compressed position as the blade is positioned on the razor guide;
wherein, once the spring is compressed, the switch is designed to activate the plurality of spray nozzles
wherein the plurality of spray nozzles is designed to spray the blade with the chemical solution;
wherein each spray nozzle of the plurality of spray nozzles is separately connected to the pod;
wherein the display is operable to indicate when the plurality of spray nozzles is spraying the blade; and
wherein the display is further operable to indicate when the plurality of spray nozzles is finished spraying.

17. The assembly of claim 16, wherein the razor guide includes an end wall, wherein the end wall is designed to position the blade to face the plurality of spray nozzles.

18. The assembly of claim 16, wherein the display further includes at least one indicator, wherein the at least one indicator is operable to indicate a solution level, wherein the at least one indicator is designed to generate a yellow light when the chemical solution is low and a red light when the chemical solution is empty or near empty.

19. The assembly of claim 16, wherein the display is further operable to indicate a battery level.

20. The assembly of claim 16, wherein the pod includes a transparent material.

* * * * *